United States Patent

Claar et al.

[11] Patent Number: 5,253,575
[45] Date of Patent: Oct. 19, 1993

[54] COVER DRIVING SYSTEM

[75] Inventors: Klaus-Peter Claar, Gechingen; Frank van de Poel, Rottenburg; Kurt Schaible, Aidlingen; Jürgen Schrader, Weil im Schönbuch; Holger Seel, Aidlingen, all of Fed. Rep. of Germany

[73] Assignee: Mercedes-Benz AG, Fed. Rep. of Germany

[21] Appl. No.: 923,447

[22] Filed: Aug. 3, 1992

[30] Foreign Application Priority Data

Aug. 3, 1991 [DE] Fed. Rep. of Germany ....... 4125829

[51] Int. Cl.⁵ ............................................. F15B 15/26
[52] U.S. Cl. ........................................... 91/44; 91/392; 91/521; 296/117
[58] Field of Search ....... 60/420; 91/361, 15, 91/41, 42, 44, 392, 508, 521, 533, 536; 296/107, 117

[56] References Cited

U.S. PATENT DOCUMENTS

| 2,715,545 | 8/1955 | Orr | 296/117 |
| 3,489,063 | 1/1970 | Piret | 91/361 |
| 3,779,136 | 12/1973 | Hohlein | 91/361 |
| 5,110,175 | 5/1992 | Fischbach | 296/117 |

FOREIGN PATENT DOCUMENTS

| 925445 | 2/1955 | Fed. Rep. of Germany . |
| 948849 | 8/1956 | Fed. Rep. of Germany . |
| 3502752 | 7/1986 | Fed. Rep. of Germany . |
| 3826789 | 2/1990 | Fed. Rep. of Germany ...... 296/117 |
| 7807976 | 10/1978 | France . |
| 734434 | 8/1955 | United Kingdom ................ 296/117 |
| 862883 | 3/1961 | United Kingdom . |

Primary Examiner—Edward K. Look
Assistant Examiner—Hoang Nguyen
Attorney, Agent, or Firm—Evenson, McKeown, Edwards & Lenahan

[57] ABSTRACT

A drive system for a lid or a flap of a convertible car body in which the control effort for the drive system is reduced by configuring the working cylinder as a control valve which releases the lid or the like after unlocking of the lock for lifting by the lifting cylinder, and is connected between the control device and the lifting cylinder.

3 Claims, 2 Drawing Sheets

COVER DRIVING SYSTEM

BACKGROUND AND SUMMARY OF THE INVENTION

The present invention relates to a drive system for a covering such as a door, a lid or the like, especially for the lid of a hood receiving compartment of an open car, comprising at least one lifting cylinder which engages on the covering for the purposes of opening and closing, a lock for locking and unlocking the covering, a working cylinder for transferring the lock into a locking position and into an unlocking position, a control valve to which the lifting cylinder is connected via a pressure line, and a control unit for controlling the control valve.

In the Mercedes-Benz SL series, the opening and closing of the hood automatically is undertaken with a hydraulic drive system. In order to close the hood and to move it out of its receiving compartment, it is initially necessary to lift the hood box lid serving as a covering. This hood box lid is locked in its closed position by a mechanical lock actuated by a hydraulic working cylinder. The lifting of the hood box lid is performed by a hydraulic lifting cylinder. An independent control valve is provided for both the working cylinder and the lifting cylinder, with the two being linked by a control device such that the control valve for the movement of the working cylinder to unlock the lock is actuated first, followed by the control valve for the lifting cylinder. The corresponding procedure is followed in reverse for opening of the hood.

DE-PS 925 445 and 48 849 show that in the case of an automatically actuatable hood of a car, it was known initially to swing forward a backrest of a passenger seat before lifting of the hood. The hydraulic cylinders for lifting of the hood and for swinging over of the backrest were linked to each other by a corresponding sequential control. However, no provision was made for a hood box lid which locks a hood receiving compartment and is provided with its own drive system.

An object of the present invention is to improve a covering drive system so that it can be operated with a reduced control effort.

This object has been achieved in accordance with the present invention by arranging the working cylinder in the pressure line. One connection on the working cylinder is connected to the control valve and one connection is connected to the lifting cylinder. Irrespective of the position of the piston of the lifting cylinder and after the transfer of the lock into the unlocking position, the pressure line is released to open the covering.

The result achieved by this measure is that the working cylinder provided for locking is simultaneously used to control the movements of the lifting cylinder. This is advantageous, since the lock of the covering must in any case first be unlocked before lifting of the covering. As a result, the control effort of the drive system is reduced, and an additional control device for the working cylinder is rendered unnecessary.

The control device therefore requires, according to the present invention, only one control valve which triggers a sequential control for the working cylinder and the lifting cylinder.

In the present invention, the working cylinder contains a piston provided with a piston rod connected to the lock. The piston releases, in a position unlocking the covering, a connection of a control line connected to the lifting cylinder. As a result of this additional connection on the working cylinder, the lifting cylinder is actuated to lift the covering as soon as the working cylinder has unlocked the lock on the covering.

In a further embodiment of the present invention, two end switches are connected to the control device to signal a locked and an unlocked end position of the lock. The end switch for signalling the unlocked position of the lock additionally gives a signal for the control of the retaining position of the piston of the working cylinder. The result is to ensure that the connection of the control line on the working cylinder during the lowering movement of the piston of the lifting cylinder remains free, so that the oil thus displaced can flow through the working cylinder.

In a yet further embodiment, a stop is arranged on the piston rod of the working cylinder to actuate the two end switches. As a result, the control unit receives the necessary information, by way of the movement of the working cylinder, in order to initiate a switching-on of the working cylinder.

In a still further embodiment of the present invention, the connection of the working cylinder for the control line is arranged at a distance from a lower stop point of the piston which is somewhat less than the height of the piston, and the distance of the connection from the upper stop point of the piston is greater than the height of the piston. As a result, the piston retains the control line closed in its lower reverse position, but releases it in the region of its upper end position. When the lock is unlocked, the lifting cylinder can thus lift the covering In another embodiment of the present invention, the piston of the working cylinder is provided with an annular groove from which a return line starts and extends through the piston, terminating in its end face remote from the piston rod and provided with a return valve which is open towards this termination. Consequently, the piston of the working cylinder can be lowered simultaneously with the piston of the lifting cylinder, since the oil displaced in the lifting cylinder can flow through the return line of the working cylinder, which is provided with a return valve. It is thus no longer necessary to have an end switch giving a signal to control the retaining position of the piston of the working cylinder. The piston thus no longer has a locking function so that, for example, an automatically locking lock can be used.

BRIEF DESCRIPTION OF THE DRAWINGS

These and other objects, features and advantages of the present invention will become more readily apparent from the following detailed description of currently preferred embodiments when taken in conjunction with the accompanying drawings wherein.

DETAILED DESCRIPTION OF THE DRAWINGS

Figure 1:
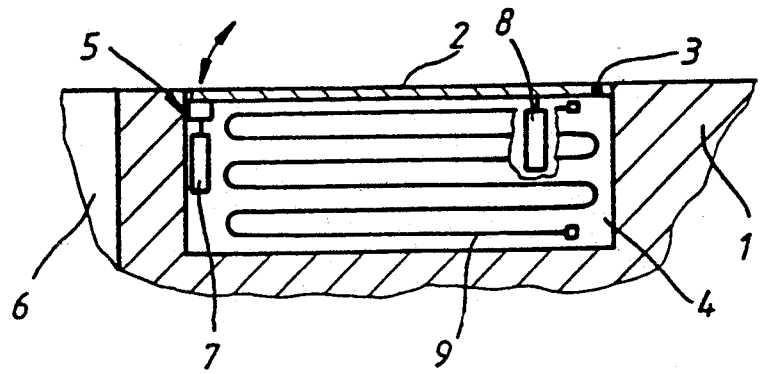
FIG. 1 is a schematic longitudinal sectional view along a vertical median plane of a convertible through a hood receiving compartment in the region behind the back seat of the convertible car having a drive system according to the present invention.

In a convertible car, a hood 9 connecting the windscreen of the car is stretched over the passenger compartment 6 and, after opening, is folded together and laid in a hood receiving compartment 4 inset into the bodywork 1 behind the passenger compartment 6. The hood receiving compartment 4 is arranged in an approximately U-shaped manner in the rear region of the passenger compartment 6 since the hood 9, in its folded-together state, is likewise U-shaped as a result of the corresponding rod linkage. The foregoing arrangement of the hood 9 and of the hood receiving compartment 4 is generally known and therefore, is not further described in detail.

The hood receiving compartment 4 is closed by a plate-shaped covering 2 which is mounted to be pivotable about a horizontal pivot axis 3 on its rear side. The hood 9 can be opened and closed automatically by a hydraulic system. The various devices for the automatic lifting and lowering of the hood 9 are, however, not shown for reasons of simplicity. The movement of the covering 2 is likewise performed automatically by a drive system which will be described in due course and which is synchronized with the devices for raising or lowering the hood 9 such that the covering 2 does not impede the movements of the hood 9.

In the embodiment according to FIG. 1, a lifting cylinder 8 is provided for pivoting the covering 2 and is attached in an approximately vertical alignment to the side of the hood receiving compartment 4. The piston rod 25 of the cylinder 8 is articulated on the covering 2. Approximately in the central region of the front of the hood receiving compartment 4, a mechanical lock 5 is provided which locks the covering 2 in its closed position. This lock 5 is automatically actuated by a working cylinder 7 whose piston rod 11 is articulated on a corresponding lock element for locking and unlocking the covering 2. A stop is provided on the piston rod of this working cylinder 7 and serves to switch two end switches 13, 14 which respectively signal the unlocked position of the lock 5 (end switch 14) and the locked position of the lock 5 (end switch 13).

The end switch 14 for signalling the unlocked position of the lock 5 also gives a signal for the control of the retaining position of the piston 10 of the working cylinder 7, since the piston 10 of the working cylinder 7 has to be retained in its upper end position during the lowering of the piston of the lifting cylinder 8, in order to keep free the connection 20 for the oil return.

A piston 10, which is adjoined by the piston rod 11 projecting to the lock 5, is axially movable in the working cylinder 7. The piston rod is thus movable in the direction of the arrow 24. The working cylinder 7 is likewise attached to the front inside wall of the hood receiving compartment 4 in an approximately vertical alignment. Both the working cylinder 7 and lifting cylinder 8 are hydraulic cylinders which are connected to a hydraulic reservoir by suitable lines, hereinafter described.

In another embodiment, one lifting cylinder 8 can be provided on each side of the covering 2. In addition, a lock 5 can be located in the region of each U-shaped leg of the covering 2, with each lock being actuatable by its own working cylinder 7. Four hydraulic cylinders are thus used, but the two working cylinders 7 and the two lifting cylinders 8 are actuated simultaneously, so that the fundamental structure of the drive system does not differ from the embodiment of FIGS. 1 to 3 described hereinbelow in detail.

The control of the movement of the lifting cylinder 8 and the working cylinder 7 is undertaken by a control unit S which also controls the opening and closing movements of the hood 9. The control unit S is connected to an electrically actuatable 3/2-way valve 15 which controls a hydraulic control circuit of the drive system, into which both the working cylinder 7 and the lifting cylinder 8 are integrated. The control unit S is provided with two inputs, to which the two end switches 13, 14 of the working cylinder 7 are connected.

Figure 2:
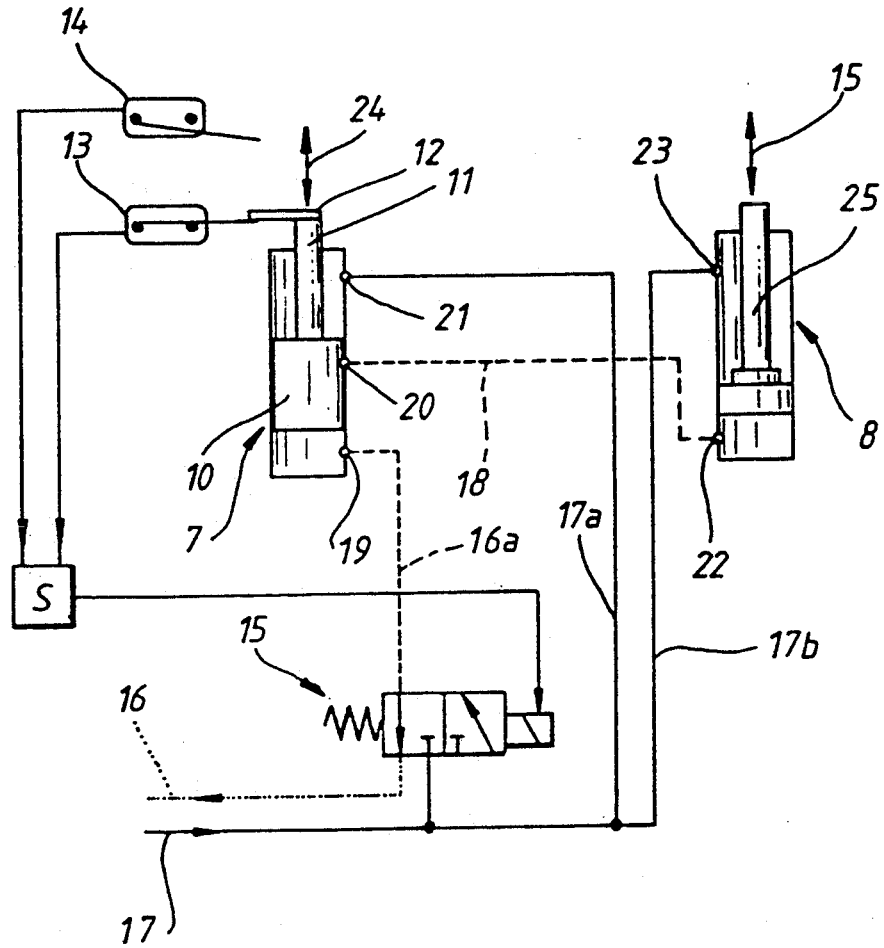
FIG. 2 is a schematic view of the drive system according to FIG. 1, in which two cylinders are actuated by a common control valve.
Figure 3:
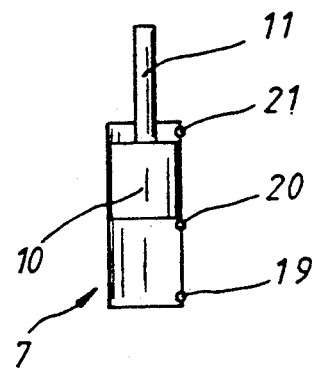
FIG. 3 is a schematic isolated view of the working cylinder for actuating the lock according to FIG. 2, and shown in a position releasing the control line to the lifting cylinder.

Also provided in the lifting cylinder 8 is a piston which is adjoined by a piston rod 25, projecting upwards in FIG. 2, which can be moved in the direction of the arrow 15 by the corresponding movements of the piston. Provided in the lower region of the lifting cylinder 8 is a connection 22 to which is connected a control line 18 for pushing up the piston and the piston rod 25. A further connection 23 is provided in the upper region of the lifting cylinder 8 and is provided with a feed line from the hydraulic reservoir for serving to lower the piston rod 25. In addition to its function in actuating the lock 5, the working cylinder 7 is configured as a control valve for the lifting cylinder 8 and is connected accordingly. The hydraulic control circuit of the drive system is now described.

The working cylinder 7 has, in the lower region, a connection 19 which is connected by a line 16a, in the position shown in FIG. 2, to a return line 16 to the hydraulic reservoir. This connection 19 serves to push up the piston 10 when the valve 15 is displaced to the left. A connection 21, which is provided in the upper region of the working cylinder 7, serves to lower the piston 10 and is connected by a line 17a to a pump line 17. An additional connection 20 is provided between the two connections 19, 21 on the working cylinder 7 for a control line 18, which is connected directly to the connection 22 of the lifting cylinder 8. The distance from the connection 20 for the control line 18 to the lower stop point of the piston 10, and hence approximately to the lower connection 19, is less than the height of the piston 10, so that the piston 10 in its lower end position, closes the connection of the control line 18. The distance of the connection 20 from the upper connection 21, and hence from the upper stop surface of the piston 10, is greater than the height of the piston 10, so that the piston 10 releases the connection of the control line 18 in its upper end position. The stroke of piston 10 corresponds to the distance between the two end switches 13, 14 which respectively determine the locked and unlocked positions of the lock 5 and hence of the covering 2.

In FIG. 2, the drive system is in a position in which the end switch 13 is actuated and the covering 2 is locked. The directional control valve 15 is pushed by the control unit S into a position in which the connection 19 to the return line 16 is connected. The pump line is in communication with the connections 21, 23 of the working cylinder 7 and of the lifting cylinder 8, so that the two pistons 10, 25 are pressed downwards. In order now to erect the hood 9 again, from its laid-down position 9 in the hood receiving compartment 4 shown in FIG. 1, it is initially necessary to unlock and lift the covering 2. This is done by the control unit S pushing the slide of the directional control valve 15 towards the left in FIG. 2, as a result of which the line 16a of the connection 19 is connected to the pump line 17 of the hydraulic reservoir and the line 17a is connected to the return line 16. The connection 21 of the working cylinder 7 is opened, so that the oil displaced by the movement of the piston 10 can flow out. During the upward pressing of the piston 10, the connection 20 remains closed until the stop 12 has reached the second end switch 14, which can indicate the unlocked position. Shortly before reaching its upper end position, the piston 10 releases the connection 20 for the control line 18 to the lifting cylinder 8. Since the lock 5 for the covering 2 is unlocked, this can now be lifted by the lifting cylinder 8. The directional control valve 15 remains in its pump position, so that the pump line 17, via the line 16a through the working cylinders 7 and by way of the control line 18, pumps oil through the connection 22 into the lifting cylinder 8. As a result, the piston and the piston rod 25 are lifted, so that the covering 2 is pivoted upwards.

As soon as the piston, together with the piston rod 25, has reached its upper end position, the covering 2 is opened. Here again, the respective end positions are signalled to the control unit S by suitably arranged, conventional end switches (not shown). The hood 9 can now be moved out.

In order to close the hood receiving compartment 4 again after the moving-out of the hood 9, the directional control valve 15 is switched over by the control unit S and pushed to the right. In this position the connection 19 of the working cylinder 7 is again connected to the return line 16. Since the working cylinder 7 is still retained in the position shown in FIG. 3 by the mechanical barrier of the lock 5, the control line 18 is opened so that the oil can flow back from the lifting cylinder 8 by the control line 18 and the working cylinder 7, and the line 16a, into the hydraulic reservoir. As soon as the piston of the lifting cylinder 8 is lowered into its position shown in FIG. 2, and the covering 2 has arrived in its closed position, the covering 2 presses on the lock 5 which, in turn, releases the piston rod 11 and the piston 10 of the working cylinder 7. As a result of the further return flow of the oil from the space of the working cylinder 7 underneath the piston 10, the stop 12 of the piston rod 11 now returns into its lower position adjoining the end switch 13, in which the lock 5 and hence the covering 2 are locked.

Figure 4:
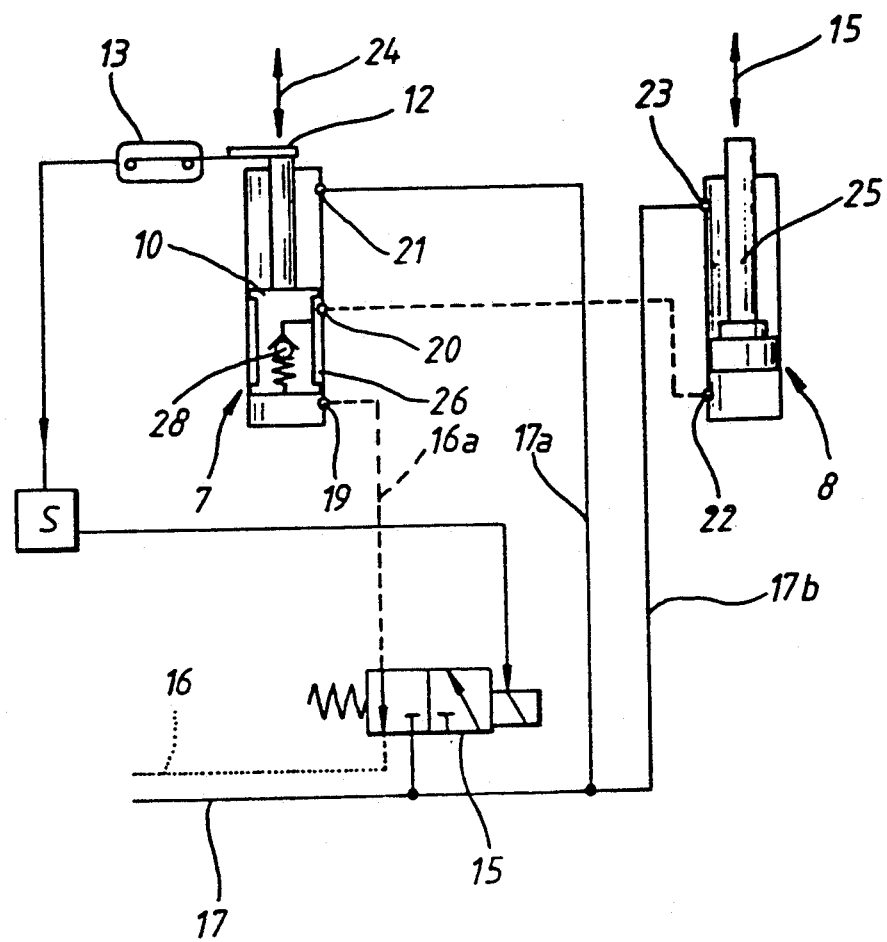
FIG. 4 is a schematic view of the drive system according to FIG. 1 in which the two cylinders are actuated by a common control valve and the piston of the working cylinder is provided with an annular groove and a return line with a return valve according to another embodiment of the present invention.
Figure 5:
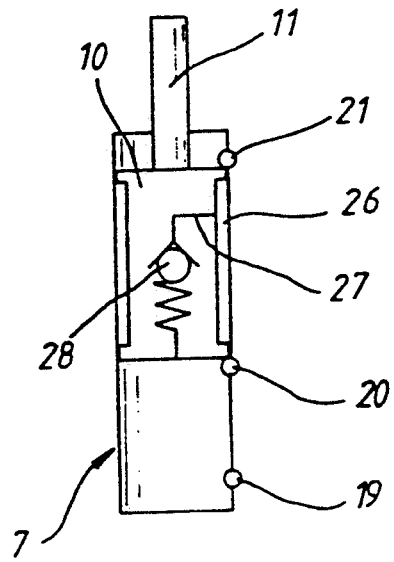
FIG. 5 is a schematic isolated view of the working cylinder for actuating the lock of FIG. 4, and is shown in a position releasing the control line to the lifting cylinder.

A further embodiment of the present invention is shown in FIGS. 4 and 5. According to FIG. 4, and particularly clearly apparently in FIG. 5, the piston 10 of the working cylinder 7 is provided with an annular groove 26. Starting from the annular groove 26, a return line 27 extends through the piston 10 and terminates at the side thereof remote from the piston rod 11 as seen in FIG. 5. A return valve 28 is open towards the termination of the return line 27. The connections 19, 20, 21 are arranged in a similar manner to those in the above-described embodiments. The connection 20 is arranged at a distance from the lower stop point of the piston 10, and hence approximately from the lower connection 19, which is somewhat less than the distance between the lower stop point of the piston 10 and the end of the annular groove 26 facing the piston rod 11. The connection 20 of the control line 18 is thus closed in the lower end position of the piston 10. FIG. 4 shows the piston 10 of the working cylinder 7 in its lower end position. The length of the annular groove 26 is somewhat less than the height of the piston 10, so that a reliable sealing of the piston 10 against the wall of the working cylinder 7 is still guaranteed. The distance of the connection 20 from the upper stop point of the piston 10 is greater than the height of the piston 10, so that the piston 10 in its upper end position releases the connection 20 of the control line 18. FIG. 5 shows the piston 10 of the working cylinder 7 in its upper end position.

An end switch 13 is arranged to signal the locked position of the lock 5 and is actuated by a stop 12 arranged on the end face of the piston rod 11. In all other respects, however, the structure of the drive system shown in FIGS. 4 and 5 corresponds to that of the previously described embodiment.

In FIG. 4, the drive system is in the position in which the end switch 13 is actuated and the covering 2 is locked. The 3/2-way valve 15 is pushed by the control unit S into a position in which the connection 19 communicates with the return line 16. The pump line is in communication with the connections 21, 23 of the working cylinder 7 and of the lifting cylinder 8, so that the two pistons 10, 25 are pressed downwards. In order now to erect the hood 9 from its laid-down position 9 in the hood receiving compartment 4 shown in FIG. 1, the covering 2 initially has to be unlocked and lifted. This is achieved by the control unit S pushing the slide of the 3/2-way valve 15 towards the left in FIG. 4. As a result, the line 16a of the connection 19 is connected to the pump line 17 of the hydraulic reservoir and the line 17a to the return line 16. The connection 21 of the working cylinder 7 is opened, so that the oil displaced by the movement of the piston 10 can flow out. During the upward pressing of the piston 10, the connection 20 remains closed. Penetration of the oil via the return line 27 into the annular groove 26 is prevented by the return valve 28, which provides a barrier in this direction.

Shortly before reaching its upper end position, the piston 10 releases the connection 20 for the control line 18 to the lifting cylinder 8.

The further functional procedures until the hood 9 is moved out correspond to those of the first embodiment. After the hood 9 is moved out, the 3/2-way valve 15 is switched over in a manner already described, so that the connection 19 of the working cylinder 7 is connected to the return line 16. In this switched position, the oil flows out of the lifting cylinder 8 via the control line 18, the working cylinder 7 and the line 16a, back into the hydraulic reservoir. At the same time, the piston 10 of the working cylinder 7 is lowered, so that the oil from the working cylinder 7 can likewise flow through the line 16a into the hydraulic reservoir. When the piston 10 is lowered, the annular groove 26 of the piston 10 reaches the region of the connection 20 of the control line 18, so that the oil from the lifting cylinder 8 can flow back via the return line 27, beginning at the groove base of the annular groove 26, and the return valve 28 which is open towards the termination of the return line 27.

In comparison with the previously described embodiment, the pistons 10, 8 of the working cylinder 7 and of the lifting cylinder 8 move, in the FIG. 4 embodiment, simultaneously towards their lower end positions. As a result of the further return flow of the oil from the lifting cylinder 8 and the working cylinder 7, the stop 12 of the piston rod 11 again reaches its position in contact with the end switch 13, in which the lock 5 and hence the covering 2 are locked.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A drive system for a covering of a convertible car, comprising at least one lifting cylinder adapted to engage on the covering for opening and closing, a lock for locking and unlocking the covering, a working cylinder for transferring the lock into a locking position and into an unlocking position, a control valve to which the lifting cylinder is connected via a pressure line and a control unit configured for controlling the control valve, wherein the working cylinder is arranged with two connections in the pressure line, one of the connections on the working cylinder being to the control valve and another of the connections on the working cylinder being to the lifting cylinder, and, after the lock is transferred to the unlocking position, the working cylinder being configured such that the pressure line communicates with the lifting cylinder to allow movement of the lifting cylinder to open the covering independently of a position of a piston of the lifting cylinder wherein the another connection is arranged at a distance from a lower stop point of a piston of the working cylinder, which lower stop point is a predetermined amount less than the height of the piston of the working cylinder, and the distance of the another connection from an upper stop point of the piston of the working cylinder is greater than the height of the piston of the working cylinder.

2. A drive system for a covering of a convertible car, comprising at least one lifting cylinder adapted to engage on the covering for opening and closing, a lock for locking and unlocking the covering, a working cylinder for transferring the lock into a locking position and into an unlocking position, a control valve to which the lifting cylinder is connected via a pressure line and a control unit configured for controlling the control valve, wherein the working cylinder is arranged with two connections in the pressure line, one of the connections on the working cylinder being to the control valve and another of the connections on the working cylinder being to the lifting cylinder, and, after the lock is transferred to the unlocking position, the working cylinder being configured such that the pressure line communicates with the lifting cylinder to allow movement of the lifting cylinder to open the covering independently of a position of a piston of the lifting cylinder wherein a piston with a piston rod of the working cylinder has an annular groove, and a return lie starts from the annular groove, extend through the piston and terminates in an end face of the piston remote from the piston rod, and a return valve is operatively arranged in the return line open in the direction of termination of the return line.

3. The drive system according to claim 2, wherein the another connection is arranged at a distance from a lower stop point of the piston which is a predetermined amount less than the distance between the lower stop point of the piston and an end of the annular groove is a predetermined amount less than the height of the piston, and the distance of the another connection from an upper stop point of the piston is greater than the height of the piston.

* * * * *